United States Patent
Heller et al.

(10) Patent No.: US 12,122,889 B2
(45) Date of Patent: Oct. 22, 2024

(54) DRY PREPREG FOR CERAMIC MATRIX COMPOSITES

(71) Applicant: 3M INNOVATIVE PROPERTIES COMPANY, St. Paul, MN (US)

(72) Inventors: Daimon K Heller, Houlton, WI (US); Aaron R. Beaber, Minneapolis, MN (US); Amit J. Patel, Saint Paul, MN (US); Kari A. McGee, New Brighton, MN (US); Henrik B. Van Lengerich, Saint Paul, MN (US); James M. Reimer, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 607 days.

(21) Appl. No.: 17/426,269

(22) PCT Filed: Jan. 27, 2020

(86) PCT No.: PCT/IB2020/050615
§ 371 (c)(1),
(2) Date: Jul. 28, 2021

(87) PCT Pub. No.: WO2020/157632
PCT Pub. Date: Aug. 6, 2020

(65) Prior Publication Data
US 2023/0365767 A1  Nov. 16, 2023

Related U.S. Application Data

(60) Provisional application No. 62/797,821, filed on Jan. 28, 2019.

(51) Int. Cl.
| | | |
|---|---|---|
| *C04B 35/628* | (2006.01) | |
| *B32B 18/00* | (2006.01) | |
| *C04B 35/626* | (2006.01) | |
| *C04B 35/634* | (2006.01) | |
| *C04B 35/80* | (2006.01) | |
| *C08J 5/24* | (2006.01) | |
| *C04B 111/00* | (2006.01) | |

(52) U.S. Cl.
CPC ............... *C08J 5/241* (2021.05); *B32B 18/00* (2013.01); *C04B 35/62655* (2013.01); *C04B 35/62852* (2013.01); *C04B 35/62892* (2013.01); *C04B 35/63448* (2013.01); *C04B 35/80* (2013.01); *C08J 5/249* (2021.05); *C04B 2111/00896* (2013.01); *C04B 2235/3217* (2013.01); *C04B 2235/3418* (2013.01); *C04B 2235/5252* (2013.01); *C04B 2235/616* (2013.01); *C08J 2379/00* (2013.01)

(58) Field of Classification Search
CPC .............. C04B 35/62892; C04B 35/80; C04B 2235/3217; C04B 2235/3418; C04B 2235/5252; C04B 2235/616; C04B 2111/00896
USPC .......................................................... 523/222
See application file for complete search history.

(56) References Cited

U.S. PATENT DOCUMENTS

| | | |
|---|---|---|
| 5,024,978 A | 6/1991 | Allaire |
| 5,512,351 A | 4/1996 | Miyamichi |
| 5,601,674 A | 2/1997 | Szweda |
| 5,856,252 A | 1/1999 | Lange |
| 6,096,164 A | 8/2000 | Benson |
| 8,313,598 B2 | 11/2012 | Butler |
| 9,102,571 B2 | 8/2015 | Szweda |
| 2005/0112321 A1 | 5/2005 | Millard |
| 2005/0218565 A1 | 10/2005 | DiChiara |
| 2010/0081556 A1 | 4/2010 | Heng |
| 2013/0157037 A1 | 6/2013 | Matsumoto |
| 2014/0200130 A1 | 7/2014 | Szweda |
| 2016/0031762 A1 | 2/2016 | Matsumoto |
| 2017/0130017 A1 | 5/2017 | Okamoto |
| 2019/0210930 A1 | 7/2019 | Knohl |

FOREIGN PATENT DOCUMENTS

| | | |
|---|---|---|
| CN | 106699209 | 11/2019 |
| CN | 106904952 | 2/2020 |
| DE | 19826792 | 2/2002 |
| WO | WO 2016-016388 | 2/2016 |

OTHER PUBLICATIONS

International Search Report for PCT International Application No. PCT/IB2020/050615, mailed on Apr. 29, 2020, 4 pages.
International Preliminary Report on Patentability for PCT International Application No. PCT/IB2020/050615, mailed on May 17, 2021, 17 pages.

*Primary Examiner* — Ruiyun Zhang
(74) *Attorney, Agent, or Firm* — Thomas M. Spielbauer

(57) ABSTRACT

Dry prepregs for ceramic matrix composites are described. The dry prepregs comprise a tow or fabric of ceramic fibers infiltrated with preceramic matrix comprising low levels of an aqueous solvent. The preceramic matrix contains an inorganic portion and a binder system. Binder systems comprising a binder and a plasticizer for the binder are described.

16 Claims, No Drawings

DRY PREPREG FOR CERAMIC MATRIX COMPOSITES

CROSS REFERENCE TO RELATED APPLICATIONS

This application is a national stage filing under 35 U.S.C. 371 of PCT/IB2020/050615, filed 27 Jan. 2020, which claims the benefit of Provisional Application No. 62/797,821, filed 28 Jan. 2019, the disclosure of which is incorporated by reference in their entirety herein.

FIELD

The present disclosure relates to prepreg for use in ceramic matrix composites. Such prepregs comprise a tow or fabric of ceramic fibers impregnated with a dry preceramic matrix. Methods of making articles using such dry preceramic matrix composite prepregs are also described.

SUMMARY

Briefly, in one aspect, the present disclosure provides a dry prepreg according to claims 1-11.

In another aspect, the present disclosure provides a method of making a dry prepreg according to claim 12.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Ceramic fibers are well-known and available from a variety of commercial sources. Composites may be formed by embedding ceramic fibers in a variety of matrices including polymers (i.e., polymer matrix composites, "PMC"), metals (i.e., metal matrix composites "MMC"), and ceramics (i.e., ceramic matrix composites "CMC"). In some embodiments, ceramic matrix composites, which comprise reinforcing ceramic fibers embedded in a ceramic matrix, can provide superior performance including high-temperature resistance and stability, mechanical strength, hardness, and corrosion resistance.

CMCs based on oxide ceramic fibers in an oxide ceramic matrix, so-called oxide-oxide (or Ox-Ox) CMCs, are of particular interest in, e.g., the aerospace industry. Oxide-based ceramic fibers include, e.g., alumina fibers and alumina-silica fibers. Oxide-based ceramic fibers may include additional components such as boria, alkaline earth oxides, alkali metal oxides, and metals. Oxide-based ceramic matrices include those derived from alumina, silica, and mullite.

Ceramic fibers have been available as individual fibers (sometimes referred to as filaments) or as tows. A tow (sometimes referred to as a strand or roving) is a bundle of fibers aligned along a common axis. Tows are available in a variety of forms including spread tows and circular or elliptical tows. Generally, spread tows may have an aspect ratio (A2/A1) of no greater than 0.05, e.g., no greater than 0.03, or even no greater than 0.02, wherein A1 is the width of the tow and A2 is the thickness. For comparison, traditional circular or elliptical tows may have an aspect ratio ranging from 1 to 0.1. Tows of ceramic fibers are also available as yarns comprising multiple tows twisted together; "tapes" comprising parallel tows stitched together; and fabrics comprising woven tows. Fabrics and tapes may be prepared from any combination of standard (circular or elliptical) and spread tows.

In typical CMC processes, tows of ceramic fibers are impregnated with a ceramic matrix slurry to form a ceramic prepreg. Generally, a slurry is a dispersion of an insoluble solid in a liquid. Ceramic matrix slurries (also called pre-ceramic matrix slurries) typically contain ceramic particles dispersed within a solvent, commonly water. The slurries may also include one or more additional components such as binders, plasticizers, drying control aids, dispersants, and inorganic precursors, e.g., preceramic polymers. Some slurries include a ceramic sol comprising a colloidal solution of about 15 to 60% by weight solids in a solvent, e.g., water.

In one common process, a woven fabric of tows of ceramic fibers is infused with a ceramic matrix slurry to form the prepreg. After infiltration, it is common for some fraction of the solvent to be removed in a process called staging. Staging is used to promote the development of tack, a characteristic that facilitates adhesion between adjacent layers during layup and enables their application across a tool surface with complex contours without delamination or sliding. However, even after staging, the prepregs contain 15 wt. %, 25 wt. % or even 40 wt. % water based on the total weight of the matrix. In a subsequent step, the prepreg is formed to the desired shape, sometimes referred to as a "green body," using known methods such as hand layup and automated pick-and-place operations.

In another CMC processes, individual tows of ceramic fibers are impregnated with the ceramic matrix material to form a ceramic prepreg (also referred to as a towpreg). For example, the ceramic fibers may be dipped into a ceramic matrix slurry so that the solvent and ceramic particles are infused into the bundle of ceramic fibers to form the prepreg. This wet prepreg may be wound onto cores for use in a later process. In other cases, the wet prepreg is immediately transported to further processes in-line with the impregnation step. In the layup step, the wet prepreg is formed to the desired shape, sometimes referred to as a "green body," using known methods such as drum winding, filament winding, automated tape layup, and advanced fiber placement.

Following layup, the slurry infused fabric-based or tow-based structures are dried and consolidated. In this step, often performed in an autoclave, solvents are removed, the layup is compacted, and voids are reduced or eliminated. The consolidated layup is then fired to remove any remaining solvents, burn-off organics, and sinter the ceramic particles to form the fired CMC article.

To fabricate viable composites, the components of the matrix must be combined with the fiber to achieve acceptable volume fractions. Published data provide reliable directions as to the optimal volume fraction of components in an oxide-oxide CMC. For example, in a typical ceramic fiber reinforced composite, the ceramic fibers typically occupy about 45-55 vol. % of the composite with an additional 20-25 vol. % attributed to porosity. Thus, the remaining 20-35 vol. % is occupied by the fired ceramic matrix. However, the specific volume percents will depend upon the materials selected. Since shrinkage during firing is very small, the volume fraction of components for the consolidated, pre-fired laminate will be close the volume fractions in the final part.

Water-based slurries with low amounts of organic binders and high amounts of water are frequently used in the manufacture of CMCs in fabric-based layup procedures. For example, typical ceramic matrix slurries may contain about 0 to 8 wt. % of binders based on the total weight of the ceramic matrix slurry. Plasticized binder systems typically contain about 0-5 wt. % binder and about 2 to 10 wt. % plasticizer. Unplasticized systems may contain about 25 to 45 wt. % water, while plasticized systems may contain lower amounts, e.g., 15 to 35 wt. % water.

Because of excessive drying, these fabrics have a limited "out-time" during which they can be processed without losing their desirable tack and handling characteristics. Such prepregs are not considered stable and their use requires special storage and handling conditions to ensure viability of the materials. For example, such prepregs may need to be frozen during shipping and storage to maintain the desired water content. In addition, they may require a rapid layup process to avoid drying out and may even need to be handled in controlled humidity environments to avoid excessive loss of moisture.

These problems are becoming more critical as the industry transitions from manual layup procedures to automated processing, e.g., with "pick and place" of prepreg fabrics or filament winding and advanced fiber placement of towpregs. These processes will require a slurry with enough tack to be self-adherent. Preferably, they will have a longer out time during layup and will not require extensive humidity control.

Automated methods of forming CMCs from towpreg will place even more demands on the slurry. Ideally, ceramic matrix slurries would lead to towpregs capable of use in the AFP hardware currently used in the polymer matrix composite industry. Such towpregs would provide stability leading to long out-times; easy handling, tack sufficient to steer a tow over a desired radius (e.g., about 1500 mm) during layup; and seamless lamination between plies during the consolidation step at pressure/temperature combinations practical in an autoclave. Such towpregs should also fire to produce composites with the desired properties and performance desired for CMCs. Generally, the water-based slurry compositions used in typical fabric-based hand-layup process lack the desired balance of properties and have many of the drawbacks associated with slurry-based fabric layup.

The present disclosure relates to "dry" prepregs. Generally, it may not be possible to remove all water from a composition. For example, if a component is hygroscopic, some amount of moisture may remain despite attempts at complete drying. Therefore, as used herein, a "dry" prepreg comprises ceramic fibers infiltrated with a preceramic matrix comprising no greater than 4 wt. % water based on the total weight of the ceramic matrix. In some embodiments, the dry prepreg comprises no greater than 2 wt. % or even no greater than 1.5 wt. % water based on the total weight of the ceramic matrix. As used herein, "preceramic matrix" refers to the ceramic matrix before the organic materials are removed and the inorganics are fired and sintered.

In some embodiments, the first steps used to prepare the dry prepregs of the present disclosure are similar to those currently used in that a tow or fabric of ceramic fibers is infused with a ceramic matrix slurry. However, the compositions of the slurries used in the present disclosure allow all or substantially all of the water to be removed before layup. As a result, such dry prepregs may be stored and shipped without the need for special conditions such as freezing. They also have a long out-time allowing for a slower layup process without the need for humidity-control.

Generally, the ceramic matrix slurries of the present disclosure comprise an aqueous solvent, an inorganic component, and an organic component. As used herein, an aqueous solvent is a solvent system comprising at least 80 wt. %, e.g., at least 90, or even at least 95 wt. % water. In some embodiments, the aqueous solvent is at least 99% or even 100% water. Generally, any suitable cosolvent that is soluble or miscible with water may be present in the aqueous solvent, provided the total amount of cosolvents is no greater than 20 wt. %, e.g., no greater than 10, no greater than 5 wt. %, or even no greater than 1 wt. %. The total amount of any particular cosolvent should not exceed its solubility in water.

To distinguish solvents from other liquid materials that may be present in the system, as used herein, a solvent is a liquid at room temperature and has a boiling point of no greater than 150° C. at atmospheric pressure. To facilitate subsequent processing steps, in some embodiments, the solvents have a boiling point of no greater than 125° C., or even no greater than 100° C. at atmospheric pressure. Suitable organic cosolvents to be used alone or in combination, include, e.g., alcohols (e.g., methyl, ethyl, isopropyl, and t-butyl alcohols); acetates; aromatic hydrocarbons (e.g., benzene, toluene and xylene); and aliphatic hydrocarbons (e.g., heptane, hexane, and octane). In some embodiments, isopropanol, ethanol, butanol, and various acetates may be preferred due to toxicity concerns.

Generally, the inorganic component may include any known ceramic particles. The ceramic particles are selected based on their compatibility with the ceramic fibers and the desired end-use properties. In some embodiments, the ceramic particles are oxide ceramic particles. Common ceramic particles include sol gels and particulate-based refractory materials. Exemplary refractory particles include alumina ($Al_2O_3$), and hydrates of alumina (e.g., boehmite or aluminum trihydrate) and silica ($SiO_2$), alumina-coated silica, and mullite. Sol gels include colloidal suspensions of particles in the size range of 2-300 nanometers. In some embodiments, the sols contain from about 5 wt. % to about 50 wt. % of refractory particles. Particulate slurries can use much larger refractory particles, e.g., from 0.2 to 5 microns, although, in some embodiments, even particles greater than 2 microns may cause filtering problems.

In the present disclosure, the organic component comprises a binder system to impart the desired tack, drying stability, and lamination characteristics to the prepreg without the higher levels of water previously required. The binder system comprises one or more binders and optionally, one or more plasticizers. Generally, a plasticizer is an organic material that is miscible with a binder resulting in a reduction in the complex modulus or the glass transition temperature (Tg) relative to the unplasticized binder.

The composition of the binder system is selected to provide the desired tack during handling and layup as a dry prepreg (i.e., without the need for water). In some embodiments, the desired tack may be achievable at room temperature (about 20° C.); however, this may lead to problems handling the prepreg prior to layup. In some embodiments, the dry prepregs have low or no tack at ambient conditions (e.g., 20-25° C.). Such prepregs may then be "heat-activated" to provide the desired tack needed for layup. In some embodiments, the binder system is selected to provide the desired level of tack at temperatures of no less than 30, no less than 40, or even no less than 50° C. In some embodiments, the desired tack is achieved at temperatures no greater than 150, e.g., no greater than 100, or even no greater than 70° C. Therefore, in some applications, external heat sources may be used (e.g., infrared and laser heaters) to increase the tack at the time of layup.

As the plasticizer is miscible with the binder or at least one portion of the binder, it functions to increase tack and flexibility by decreasing the Tg or the complex modulus.

Therefore, in some embodiments, a plasticizer may be added to lower the necessary layup temperatures, increase tack, and improve room temperature handleability of the dry prepregs. In some embodiments, the plasticizer is soluble or miscible with the aqueous solvent, e.g., water.

In some embodiments, suitable plasticizers may be liquids at room temperature. However, such materials may be distinguished from solvents as the boiling point of the plasticizers is high enough such that they do not appreciably evaporate at room temperature and are not dried off with the water and cosolvents in the slurry. Therefore, the plasticizers should have a boiling point at atmospheric pressure of at least 50° C., e.g., at least 75° C., or even at least 100° C. higher than the highest boiling point solvent in the system. In some embodiments, the plasticizer has a boiling point of at least 200° C., at least 250° C., or even at least 275° C., at atmospheric pressure. In addition, the plasticizer should be selected such that it is evaporated or burned-off with the other organics during the post layup steps such as during consolidation or the firing process.

Generally, the components of the binder system and their relative amounts are selected to provide the balance of properties needed throughout the CMC manufacturing process. For example, in some embodiments, the binders are soluble in the aqueous solvent used in the pre-ceramic matrix slurry yet retain or provide an acceptable viscosity to maintain compatibility with the coating process and facilitate infiltration into the tows or fabrics.

Generally, the ceramic matrix slurries of the present disclosure contain higher amounts of the binder system (the organic portion) than prior art compositions. In some embodiments, the ceramic matrix slurries of the present disclosure may contain about 10 to 20 wt. % (e.g., 10 to 15 wt. %) of the binder. In some embodiments, the binder system may include a plasticizer, e.g., about 2 to 5 wt. % (2.5 to 3.5 wt. %) of the plasticizer. The amount of plasticizer and binder depends upon the selection of these materials, and their properties. In some embodiments, no plasticizer is required. In some embodiments, the weight ratio of plasticizer to binder is from 5:95 to 30:70, e.g., 10:90 to 30:70, or even 15:85 to 25:75.

For a given preceramic matrix, higher amounts of organic binder systems may improve tack and consolidation, but if the organic to ceramic volume ratio is too high there will be too much porosity in the fired CMC when the organics are removed. Conversely, if the organic to ceramic volume ratio is too low, the fired ceramic matrix phase may have acceptable porosity, but at the expense of worse tack during layup and poor consolidation. A similar tradeoff exists between fiber volume percent and the amount of preceramic matrix infiltrated into the tow. Applying higher amounts of matrix to the tow may provide improved tack, but the resulting fiber volume percent after firing may be too low.

Following layup, the binder system should be soft and deformable/flowable at typical consolidation conditions and below the decomposition temperature of the organic materials. Consolidation typically occurs in an autoclave under vacuum. In some embodiments, under such conditions, some or all or the plasticizer may be evaporated or removed. The removal of this portion of the organics can aide in densification and reduce the amount of porosity formed when the remaining organics are burned-off during the firing step.

The present inventors discovered that, by proper selection of the binder system components, the plasticizer is not required to achieve consolidation. Therefore, while the plasticizer may be required to provide the desired mechanical properties (e.g., tack) needed for layup, in some embodiments, the binder alone can provide the desired properties needed for consolidation. In some embodiments, the binder softens and becomes flowable at temperatures of no greater than 250° C. (e.g., no greater than 200, or even no greater than 150° C.). In some embodiments, pressures may be used to assist in consolidation. In some embodiments, the binder is selected such that pressure of no greater than 1400 kPa (about 200 psi), e.g., no greater than 1000 kPa, or even no greater than 700 kPa are needed.

The binder and plasticizer combination and relative amounts are selected to function even at very low water contents. Generally, in the present disclosure, the role of water is predominately as a processing aid to disperse the ceramic precursors and provide a fluid slurry that can be easily infiltrated into the tows or fabrics. Unlike prior art systems, the water is not required for further processes steps such as for providing the tack needed for layup. Therefore, following infiltration, the prepregs of the present disclosure can be dried to remove all or nearly all the water while retaining most or substantially all of the plasticizer, an operation facilitated by the large boiling point differential between the solvent and the plasticizer. Since the water remaining in the dry prepreg is minimal and not required for the desired performance, the dry prepregs can provide improved out-times and drying stability compared to prior systems having high amounts of water.

Other process steps also impact the selection of the components and amounts of the binder system. For example, as the organics may be burned off in the firing process, low charring materials may be desired. In addition, the total amount of binder needed to achieve the desired flowability, consolidation, and tack should be selected to provide the desired amount of porosity in the fired CMC, in some embodiments, e.g., 20-25 vol. %.

Suitable binders include many water-soluble organics such as polyurethanes, polyvinyl alcohol, polyolefin oxides (e.g., ethylene oxide, propylene oxide, and copolymers thereof), polyvinyl acetate, polyoxazolines, polyacrylamides, and polyvinylpyrrolidone, as well as copolymers and blends of any of these. In addition, common ceramic binders and additives including carboxymethyl cellulose, cell gum, guar gum, and acacia gum can be used either by themselves or in combination.

Suitable plasticizers include, e.g., glycols (e.g., polyethylene glycol, propylene glycol), polyols (e.g., glycerol), sugars, and sugar alcohols.

EXAMPLES

TABLE 1

Summary of materials used in the preparation of the examples.

| I.D. | Description (density) | Trade Name and Source |
|---|---|---|
| AL-1 | Alumina (3.9 g/cc) | AKP50 |
| AL-2 | Alumina (3.9 g/cc) | ALMATIS A100 |
| AL-3 | Alumina (3.9 g/cc) | A1000SG |
| Si-1 | Silica (2.2 g/cc) | RS50 |
| Si-2 | Silica (2.2 g/cc) | NALCO 1056 (30% solids in water) |
| B-1 | Poly(2-ethyl-2-oxazoline) (1.2 g/cc) | AQUAZOL50 (50K MW; 30 wt % solids in water) from Polymer Chemistry Innovations, Inc. |
| B-2 | Poly(2-ethyl-2-oxazoline) (1.2 g/cc) | AQUAZOL50 (50K MW; 100 wt % solids) |
| B-3 | Poly(2-ethyl-2-oxazoline) (1.2 g/cc) | AQUAZOL200 (200K MW; 30 wt % solids in water) |

TABLE 1-continued

Summary of materials used in the preparation of the examples.

| I.D. | Description (density) | Trade Name and Source |
|---|---|---|
| P-1 | Glycerol (1.04 g/cc) | |
| | HNO3 (1 g/cc) | |

Slurry E was prepared by first adding 1266.7 g of an aqueous 30 wt. % solution of AQUAZOL50 (B-1) to a high-density polyethylene bottle. Then, 4.7 g of HNO3 (a dispersant) and 95 g of glycerol (P-1) were added and mixed until uniformly distributed. Next, approximately 40 drops of 1-octanol (defoamer) and 20 drops of SOLWET L-77 (surfactant) were added and mixed until uniformly distributed. Finally, 1865.5 g of ALMATIS A1000SG alumina (AL-2) were added to the jar and the mixture was ball-milled for at least 12 hours. The resulting slurry was uniform in appearance and had a viscosity of 1500-2500 cP. Ceramic matrix Slurries A-D were prepared in similar manner by combining the components in the amounts summarized in Table 2.

Slurry F was made by first adding 6.5 g of HNO3 to 703.4 g of NALCO 1056 colloidal silica (Si-2). Next, 210 g of deionized water was added, followed by 437 g of AQUAZOL50 solid (B-2). The mixture was rolled overnight. Afterwards, 109.3 g of glycerol (P-1), approximately 40 drops of 1-octanol and 20 drops of SILWET L-77 were added and mixed until uniformly distributed. Finally, 1906.2 g of ALMATIS A1000SG alumina (AL-2) were added and the mixture was ball-milled for at least 12 hours.

TABLE 2

Slurry Compositions

| | Slurry A | Slurry B | Slurry C | Slurry D | Slurry E | Slurry F |
|---|---|---|---|---|---|---|
| Inorganic | | | | | | |
| Alumina | AL-1 | AL-1 | AL-1 | AL-1 | AL-2 | AL-3 |
| Wt. % | 60.7 | 60.7 | 57.7 | 54.8 | 57.7 | 56.5 |
| Vol. % | 29.4 | 29.4 | 26.9 | 24.7 | 26.9 | 27.7 |
| Silica | — | — | — | — | — | Si-2 |
| Wt. % | 0 | 0 | 0 | 0 | 0 | 6.3 |
| Vol. % | 0 | 0 | 0 | 0 | 0 | 5.5 |
| Organic | | | | | | |
| Binder (^) | B-1 | B-3 | B-1 | B-1 | B-1 | B-2 |
| Wt. % | 10.9 | 10.9 | 11.8 | 12.6 | 11.8 | 13.0 |
| Vol. % | 17.2 | 17.2 | 17.8 | 18.4 | 17.8 | 20.7 |
| Plasticizer | P-1 | P-1 | P-1 | P-1 | P-1 | P-1 |
| Wt. % | 2.7 | 2.7 | 2.9 | 3.1 | 2.9 | 3.2 |
| Vol. % | 5.0 | 5.0 | 5.1 | 5.3 | 5.1 | 6.0 |
| Water | (*) | (*) | (*) | (*) | (*) | (**) |
| Wt. % | 25.5 | 25.5 | 27.4 | 29.3 | 27.4 | 20.8 |
| Vol. % | 48.2 | 48.2 | 49.9 | 51.4 | 49.9 | 39.8 |
| HNO3 | | | | | | |
| Wt. % | 0.15 | 0.15 | 0.14 | 0.14 | 0.14 | 0.19 |
| Vol. % | 0.3 | 0.3 | 0.3 | 0.2 | 0.3 | 0.4 |

(^) Reported based on solids fraction of the aqueous binders
(*) From aqueous solutions of binder B-1 or B-3
(**) From aqueous solution of silica Si-2 plus additional water Dry towpregs were prepared using 10,000 denier NEXTEL 610 ceramic fiber tows from 3M Company. The spread tows had a nominal width of 6 mm and were sized with PEG 20 k at a nominal coat weight of 1.2 wt. %. The ceramic matrix slurries of Table 2 were placed in a pan. The spread tow of ceramic fiber was unwound and passed through the slurry. As the tow was submerged in the slurry, it was supported by a partially submerged driven roller. After emerging from the slurry, a gapped metering roll driven at about the same speed as the drive roll was used to regulate the amount of slurry infused into the tow. The gap between the metering roll and the driven roll was controlled the amount of slurry to 40 to 80 wt. % of the dry weight of the tow.

After the slurry was metered, the wet prepreg was transferred to a liner and passed through a convention oven set to 95 to 100° C. The line speed was adjusted to produce dry towpregs containing less than about 3 wt. % water. The dry towpreg comprising the ceramic fibers infiltrated with the preceramic matrix were wound with liner onto spools for subsequent use. The compositions of the dry preceramic matrices of the towpregs are summarized in Table 3. Samples were made at different loadings expressed as both wt % and vol % fibers in the dry towpreg. The volume percent of inorganics based on the total volume of the dry ceramic matrix ("Vol % Inorg") and the weight ratio of plasticizer to binder in the binder system ("Wt. P:B") are also reported.

TABLE 3

Composition of dry towpregs.

| | Towpreg A | Towpreg B | Towpreg C | Towpreg D | Towpreg E | Towpreg |
|---|---|---|---|---|---|---|
| | | | Slurry used | | | |
| | A | B | C | D | E | F |
| Dry towpreg (percent based on fibers and dry preceramic matrix) | | | | | | |
| Fibers Wt. % | 32, 40 | 39, 51 | 34, 44 | 49 | 27, 38, 45 | 32, 39, 51 |
| Fibers Vol. % | 25, 32 | — | 26, 35 | — | 20, 29, 36 | 23, 30, 40 |
| Weight and Volume % based on dry preceramic matrix (excluding fibers) | | | | | | |
| Inorganic | | | | | | |
| Alumina | AL-1 | AL-1 | AL-1 | AL-1 | AL-2 | AL-3 |
| Wt. % | 81.6 | 81.6 | 79.7 | 77.7 | 79.7 | 71.5 |
| Vol. % | 57.0 | 57.0 | 54.0 | 51.0 | 54.0 | 46.4 |

TABLE 3-continued

Composition of dry towpregs.

| | Towpreg A | Towpreg B | Towpreg C | Towpreg D | Towpreg E | Towpreg |
|---|---|---|---|---|---|---|
| | \multicolumn{6}{c}{Slurry used} | | | | | |
| | A | B | C | D | E | F |
| Silica | — | — | — | — | — | Si-2 |
| Wt. % | 0 | 0 | 0 | 0 | 0 | 8.0 |
| Vol. % | 0 | 0 | 0 | 0 | 0 | 9.2 |
| Organic | | | | | | |
| Binder | B-1 | B-3 | B-1 | B-1 | B-1 | B-2 |
| Wt. % | 14.7 | 14.7 | 16.2 | 17.8 | 16.2 | 16.4 |
| Vol. % | 33.4 | 33.4 | 35.7 | 30.8 | 35.7 | 34.5 |
| Plasticizer | P-1 | P-1 | P-1 | P-1 | P-1 | P-1 |
| Wt. % | 3.7 | 3.7 | 4.1 | 4.5 | 4.1 | 4.1 |
| Vol. % | 9.6 | 9.6 | 10.3 | 11.0 | 10.3 | 10.0 |
| Vol % Inorganic | 57.0 | 57.0 | 54.0 | 51.0 | 54.0 | 55.6 |
| Vol. % Organic | 43.0 | 43.0 | 46.0 | 49.0 | 46.0 | 44.4 |
| Wt. P:B | 20:80 | 20:80 | 20:80 | 20:80 | 20:80 | 20:80 |

In a typical AFP layup process, the ambient conditions are expected to be about 20° C. and about 45% relative humidity (% RH). A sample of Towpreg F was stored at about 22° C. and about 26% RH and had a baseline moisture content of 0.9 wt. % based on the total weight of preceramic matrix (i.e., excluding the weight of the ceramic fibers). This sample was then held at 22° C. and 54% RH for 66 hours. The conditioned sample has a moisture content of 1.1 wt. %. Samples of three additional towpregs with other slurry systems were tested in the same manner. The baseline moisture content ranged from 0.6 to 0.9 wt. % and the conditioned moisture content ranged from 0.9 to 1.3 wt. %.

AFP Process. Dry towpregs were laid-up using a commercially available automated fiber placement (AFP) machine from Electroimpact. The dry towpregs were laid down using a single spool feed, with 30 to 60 kg of compaction applied through a 50 to 60 mm diameter roller. Layup rates varied from 4 to 25 meters per minute depending on the tack of the dry towpreg sample. Infra-red heating was used to provide composite part surface temperatures of 30 to 150° C., typically 35 to 55° C.

Flat layups of the towpregs of Table 3 were prepared using the AFP Process with layup rates of 6 to 20 m/min. Samples 15×15 cm square were prepared from 15 to 23 plys, with each ply comprising parallel straight towpregs. The first ply was deposited on a release liner substrate, with subsequent plies applied over previously deposited dry towpreg layers using a 0/90 layup pattern. Towpreg B at 51 wt. % fibers and Towpreg F at 51 wt. % fibers failed, showing low adhesion to itself. All other samples of the dry towpregs showed excellent interlayer adhesion and good adhesion to the release liner. These samples ranged from 27 to 49 wt. % fibers. Towpreg A had the lowest adhesion to the liner substrate, but this was compensated for by applying higher heat, higher pressures, and using slower layup rates.

Towpregs C (at 44 wt. % fibers) and D (at 49 wt. % fibers) were deposited on substrates with different tack levels to assess adhesion by applying the dry towpregs in arcs of decreasing radius. A carbon substrate (HEXCEL HEXPLY M21E) was used as the "high" tack substrate and PET was used as the low tack substrate. Adhesion was judged qualitatively based on how the tows laid down. "Excellent" adhesion indicates the absence of wrinkles, bubbles, or other defects in the tow. "Good" adhesion indicates minimal defects, while "Poor" adhesion indicates multiple defects.

Using the AFP Procedure at 6 m/min, a series of dry towpregs were laid down in arcs of decreasing radius of curvature from 5000 to 250 mm. Both dry towpregs showed excellent adhesion to the carbon substrate down to a radius of 1250 mm and good adhesion at 1000 mm. Towpreg C showed excellent adhesion to the PET substrate down to a radius of 1500 mm and good adhesion at 1250 mm. Towpreg D showed excellent adhesion to the PET substrate down to a radius of 2500 mm and good adhesion at 2000 mm.

NEXTEL fabric DF-11 (from 3M Company) was prepregged with Slurry B to a loading of 52 wt. % of the wet slurry based on the total weight of the prepreg. A benchtop laminator was used with a 0.56 mm (22 mil) gap and the fabric passing through two times. The prepreg was allowed to dry at ambient conditions to less than 3 wt. % water based on the weight of the preceramic matrix, resulting in 44 wt. % of the dry preceramic matrix based on the total weight of the dry prepreg.

In one experiment, two 1.3 cm×5.1 cm (0.5"×2") strips of the dried prepreg were cut from sample and oriented 90 degrees to one another. The cross construction was placed between two sheets of polyimide then two 10 cm×10 cm aluminum plates. The stack was placed in a WABASH hydraulic press that was preheated to 90° C. The platens were then compressed to approximately 320 kg (700 lbs) and held for 5 minutes. The sample was then removed and allowed to cool to ambient temperatures. The resulting crossed layers demonstrated sufficient structural integrity to be picked up by either strip of dry towpreg.

In a second experiment, 10×10 cm panels of the dry prepreg fabric were laid next to each other with an overlap of 5 cm and hot pressed. Considering the larger contact area of this overlapping sample (5×10 cm=50 cm$^2$) relative to the contact area of the cross example above (1.3 cm×1.3 cm=1.7 cm$^2$), the press load was increased to 3200 kg. The pressing conditions were 90° C. and 5 minutes. The resulting piece demonstrated sufficient structural integrity to be picked up by either panel of dry towpreg and maintain adhesion to the adjacent panel.

Slurry E was infiltrated into a fiber preform and dried to remove water. The resulting dry towpreg was 73 wt % preceramic matrix, 26 wt. % ceramic fibers, and 1 wt. % residual moisture. The dry prepreg material was used to make a 19-ply layup with an automated fiber placement machine. The layup was vacuum bagged and consolidated in an autoclave with the following temperature and pressure profiles. Upon run initialization, the pressure was immediately ramped to 1.3 MPa (195 psi) over 15-30 minutes and the temperature was ramped at 1.4° C./min (2.5° F./min) to 121° C. (350° F.) and held for 4 hours. Upon removal the laminate has less tack, was more rigid, and had a more uniform texture and appearance compared to the input layup; the adjacent bleeder layer was uniformly covered with matrix. The consolidated laminate was fired in a box furnace by heating at 1° C./min to 650° C. and then 10° C./min to 1175° C. followed by a two-hour hold. The fired laminate had a short beam shear strength of 15 MPa, a fiber fraction of approximately 26 vol. %, and overall porosity of 32 vol. %.

What is claimed is:

1. A dry prepreg comprising a tow of ceramic fibers infiltrated with a preceramic matrix comprising 45 to 60 volume % inorganic oxide and 40 to 55 volume % of an organic binder system based on the total volume of the preceramic matrix, wherein the preceramic matrix comprises no greater than 4 weight percent of an aqueous solvent based on the total weight of the preceramic matrix; wherein the organic binder system comprises a polymeric binder, wherein the polymeric binder comprises polyoxazoline.

2. The dry prepreg of claim 1, wherein the organic binder system comprises the polymeric binder and a plasticizer for the polymeric binder.

3. The dry prepreg of claim 2, wherein the polymeric binder is water-soluble.

4. The dry prepreg of claim 3, wherein the plasticizer comprises a glycerol.

5. The dry prepreg of claim 2, where in the weight ratio of plasticizer to polymeric binder in the binder system is from 10:90 to 30:70.

6. The dry prepreg of claim 1, wherein the preceramic matrix comprises at least 96 weight percent of the inorganic oxide and organic binder system based on the total weight of the preceramic matrix.

7. The dry prepreg of claim 1, wherein the aqueous solvent comprises at least 95 wt. % water.

8. The dry prepreg of claim 1, wherein the preceramic matrix comprises no greater than 1.5 wt. % aqueous solvent based on the total weight of the preceramic matrix.

9. The dry prepreg of claim 1, wherein the prepreg is a fabric comprising a plurality of tows of ceramic fibers infiltrated with the preceramic matrix.

10. The dry prepreg of claim 1, wherein the preceramic matrix comprises 50 to 60 volume % inorganic oxide and 40 to 50 volume % of the organic binder system based on the total volume of the preceramic matrix.

11. The dry prepreg of claim 1, wherein the tow of ceramic fibers has an aspect ratio (A2/A1) of no greater than 0.05, wherein A1 is the width of the tow and A2 is the thickness of the tow.

12. A method of making a dry prepreg comprising
(i) infiltrating a tow of ceramic fibers with a ceramic matrix slurry comprising an inorganic oxide, an organic binder system comprising a polymeric binder, and an aqueous solvent, wherein the polymeric binder comprises polyoxazoline; and
(ii) drying the slurry to form a preceramic matrix comprising 45 to 60 volume % of the inorganic oxide and 40 to 55 volume % of the organic binder system based on the total volume of the preceramic matrix, wherein the preceramic matrix comprises no greater than 4 weight percent of the aqueous solvent based on the total weight of the preceramic matrix.

13. The method of claim 12, wherein the organic binder system further comprises a plasticizer for the polymeric binder, where in the weight ratio of plasticizer to polymeric binder in the binder system is from 10:90 to 30:70.

14. The method of claim 12, wherein the polymeric binder is water-soluble.

15. The dry prepreg of claim 1, wherein the inorganic oxide comprises at least one of alumina or a hydrate of alumina.

16. The dry prepreg of claim 1, wherein the inorganic oxide further comprises silica.

* * * * *